Dec. 23, 1941.                C. P. STRONG                2,267,509
                        MOTOR-VEHICLE CONSTRUCTION
                         Filed Jan. 14, 1941          2 Sheets-Sheet 1
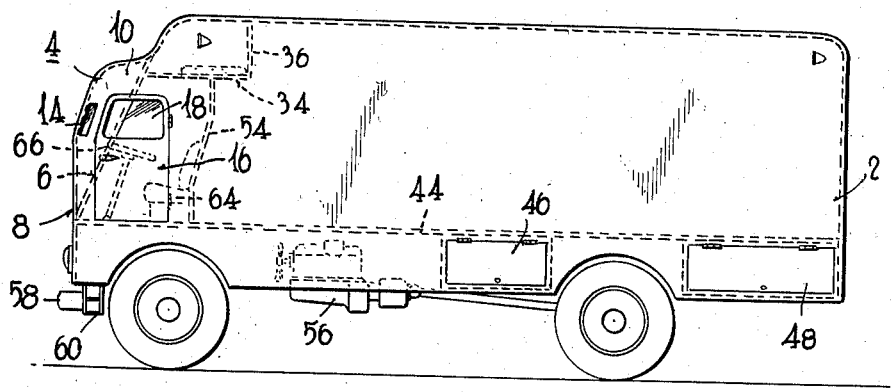
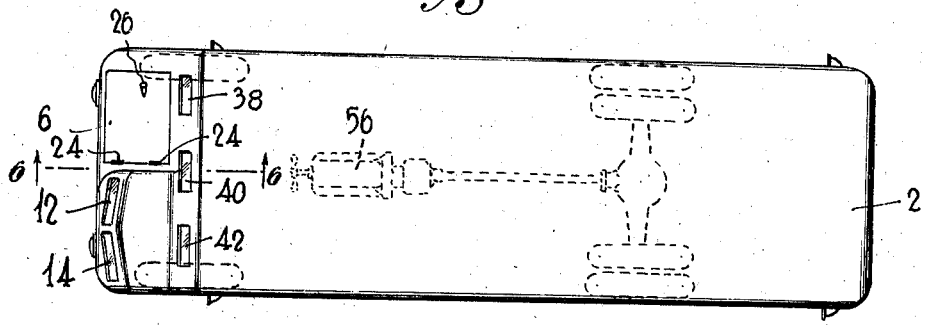
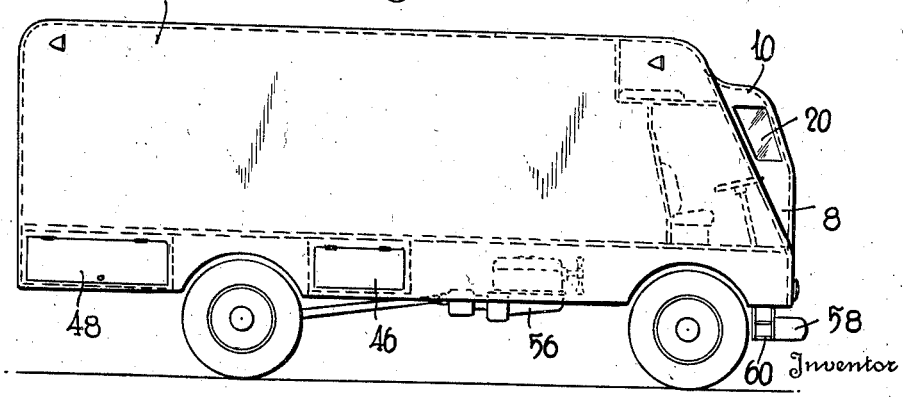
Inventor
Ceylon P. Strong,
By
Akul M. Pedersen
    Attorney Dec. 23, 1941.   C. P. STRONG   2,267,509
MOTOR-VEHICLE CONSTRUCTION
Filed Jan. 14, 1941   2 Sheets-Sheet 2
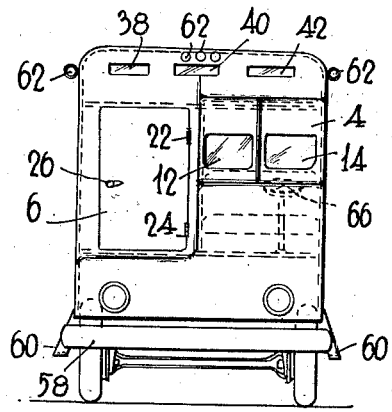
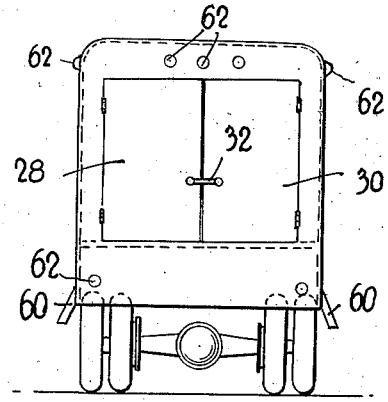
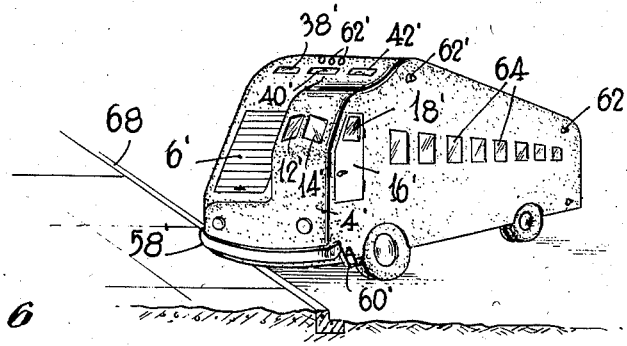
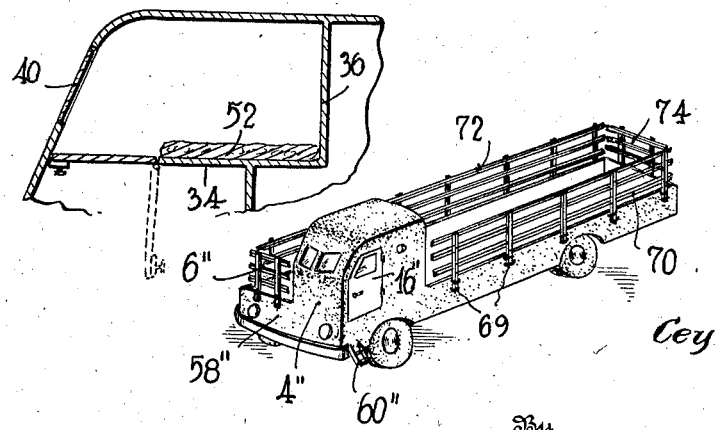
Inventor
Ceylon P. Strong,
By
Akul M. Pedersen
Attorney Patented Dec. 23, 1941

2,267,509

UNITED STATES PATENT OFFICE 2,267,509

MOTOR-VEHICLE CONSTRUCTION

Ceylon P. Strong, Millersburg, Ohio

Application January 14, 1941, Serial No. 374,379

5 Claims. (Cl. 296—24)

The present invention relates to power operated vehicles and more particularly to improvements in motor vehicle construction and arrangement of parts which is particularly adapted for trucks, buses and other forms of vehicles for the hauling of freight or baggage and for the carrying of passengers.

One of the objects of the invention is to provide a form of power operated vehicle designed for improved loading and unloading facilities particularly in congested districts.

Another object of the invention is to provide a novel form of construction for motor vehicles for the transportation of passengers or freight by which the vehicle may be loaded or unloaded through a front entrance located in such a position as not to interfere with or obstruct lateral vision from the cab or the operator's position when the vehicle is in motion.

Another object of the invention is to provide a novel form of construction for motor vehicles for the transportation of passengers or freight in which closed operator's cab is located mainly to one side of the center line of the vehicle, and in which a front opening and door permitting access to the body of the vehicle are located to one side of the cab in a position so as not to obstruct the lateral view of the operator in the closed position of the door and which permits loading and unloading of the vehicle from the front while it is drawn up to a curb at an angle.

Another object of the invention is to provide a form of motor vehicle which may be loaded either from the front or from the rear of the vehicle so that in congested districts the vehicle may be loaded or unloaded by pulling up to a curb at an angle.

Another object of the invention is to provide a form of motor vehicle in which the operator's compartment containing the operating mechanism for the vehicle is positioned mainly to the right of the center line of the vehicle, as viewed from the front thereof, and allowing sufficient space for an entrance and closure therefor at the forward portion of the body of the vehicle to the left of the said compartment so as to provide greater loading space and vehicle length for articles such as ladders, pipes, bars and the like having a greater length than the available space in the vehicle body directly behind the operator's compartment and permitting loading and unloading of the vehicle from the front portion thereof.

Another object of the invention is to provide a form of motor vehicle in which the motor and other mechanical units for operation thereof are mounted mainly under the floor of the vehicle to the rear of the operator's cab so as to provide a flat unobstructed floor space in the vehicle body for the transportation of passengers or freight.

Another object of the invention is to provide a form of commercial motor vehicle in which the operator may be seated in a relatively small closed compartment or cab for the operation of the vehicle in which the operating mechanism is readily accessible and in which forward and lateral vision during operation of the vehicle is unobstructed and in which the space normally unused at the front portion of the vehicle to one side of the operating mechanism may be utilized to a considerable extent without interference with freedom of movement or vision of the operator.

Another object of the invention is to provide a form of motor vehicle construction in which space not ordinarily utilized may be used for the transportation of articles of unusual length and in which the articles may be loaded from the front of the vehicle thus saving considerable time in the loading of the vehicle or unloading thereof, and avoiding the awkward carrying and handling of the articles ordinarily necessitated by loading from the rear.

Another object of the invention is to provide a form of motor vehicle construction particularly adapted for buses or trucks which includes a sleeping compartment for the operators located in a position so as not to interfere substantially with the loading capacity of the vehicle and in which ventilation is readily obtained.

Another object of the invention is to provide a form of motor vehicle construction particularly adapted for trucks and buses in which the motor may be located under the body portion of the vehicle so as to provide or assist in obtaining symmetrical load distribution, the control and control mechanism being connected to the driver's cab in the usual manner.

Another object of the invention is to provide a form of motor vehicle construction in which a front loading door is located to one side and slightly to the rear of the operator's cab the opening and door therefor facing in a forwardly direction and inclined rearwardly so as to increase the floor loading space but unobstructing the lateral view from the cab.

With these and other objects in view which will be apparent from the following detailed description, the invention comprises the various features and combinations hereinafter set forth and defined in the claims.

The invention is illustrated in the accompanying drawings showing a preferred embodiment of the invention and modifications thereof, in which:

Fig. 1 is a view in side elevation of a motor vehicle embodying the invention, portions thereof being indicated in dotted lines;

Fig. 2 is a top plan view of the motor vehicle shown in Fig. 1;

Fig. 3 is a view in front elevation of the motor vehicle shown in Fig. 1;

Fig. 4 is a view in side elevation taken from the left in Fig. 3;

Fig. 5 is a view in elevation showing the rear of the motor vehicle taken from the right in Fig. 1;

Fig. 6 is a fragmentary detailed sectional view taken on the section line 6—6 of Fig. 2;

Fig. 7 is a view in perspective illustrating a modification of the invention and showing the position thereof with relation to a curb for loading or unloading from the front end of the vehicle; and Fig. 8 is a view in perspective of a modification in which certain features of the invention are applied to a lorry or motor vehicle having a stake body with removable sections at the front and rear for loading and unloading.

Referring more in detail to the drawings, the numeral 2 designates the body portion of a power operated vehicle. At the forward end of the vehicle is a cab or operator's compartment 4 located preferably at the right side of the vehicle, as viewed from the front, and slightly in advance of a front door 6, the cab and the front entrance or door being in such relative positions so that during operation of the vehicle the lateral vision of the operator or driver will be unobstructed.

It will be understood that in countries or places in which traffic proceeds forwardly on the left side of the road, as in England for example, the cab may be positioned on the opposite side of the vehicle so as to be mainly to the left of the center line of the body portion thereof, and the front entrance is correspondingly on the right side of the vehicle.

The cab or operator's compartment is preferably streamlined in form, having a lower vertically extending portion 8 and an upwardly inclined portion 10, the uppermost portion of which extends rearwardly. The cab or operator's compartment is preferably provided with two lights or windows 12 and 14 at the front portion thereof which may be inclined to each other at a small angle to provide forward vision from the cab.

The cab is preferably provided with the usual side entrance door to the cab 16 which may be located on the right side of the cab as viewed from the front. A light 18 in the door serves to provide lateral vision to the left during operation of the vehicle. On the opposite side of the cab is a light or window 20 serving to provide lateral vision to the right of the vehicle during operation thereof.

The left side of the front portion of the bus or motor vehicle having the entrance door 6 is preferably inclined toward the rear at an angle such that at the level of the operator's eyes the lateral vision will be unobstructed by the forward left portion of the bus, as seen from the front.

The entrance door 6 in the preferred form of the invention is of the hinged type, having hinges 22 and 24 at the inner side of the door and having a handle 26 on the outer side of the door so that the opening of the door takes place from the curb or outer side of the door. If desired, the cab may be provided with a door on the left side thereof, as viewed from the front, or a door may be provided in the rear partition 54 to the body portion of the vehicle as may be required or desirable in specific installations.

By having the door or entrance 6 at the front end of the motor vehicle to one side of the operator's cab, the vehicle may be readily loaded from the front end when it is drawn up to a curb in the position as indicated in Fig. 7 of the drawings, thus avoiding interference with traffic in congested districts during loading and unloading of the vehicle.

At the rear end of the motor vehicle are provided the usual rear doors 28 and 30 with the usual locking bar 32 so that the vehicle may be loaded from the rear end if desired, the rear doors opening the entire width of the bus or truck so that articles having a greater width than that of the front entrance may be loaded from the rear.

In order to provide a sleeping compartment for the operator or operators, the space immediately above and behind the cab or operator's compartment may be utilized by the use of a partition 34 serving as a floor section for the sleeping compartment and with a substantially vertical partition 36 serving to separate the sleeping compartment from the main body portion of the vehicle. A mattress 52 and the necessary other equipment may be provided in the compartment, the mattress being arranged to extend transversely to the length of the vehicle so as not to interfere with the storage space in the main body portion. Windows or ventilators as 38, 40 and 42 may be provided in the sleeping compartment in the front portion of the vehicle to provide the necessary ventilation.

Access may be had to the sleeping compartment from the operator's cab by means of a trap door located in the forward portion of the floor or partition 34.

The main floor 44 of the bus or truck is preferably located in a position high enough so as to clear the motor so that the main loading space of the bus or truck is provided with a level floor.

The motor 56 furnishing the power for the operation of the vehicle is preferably located under the center portion of the body of the vehicle in order to provide for symmetrical load distribution in the vehicle, but it will be understood that the motor may be located in any other desired position such as below the operator's cab, if desired. The operator's seat 64 is preferably located at the right of the cab, as seen from the front in Fig. 3 in the usual position behind the steering wheel 66, but it will be understood that a dual steering mechanism may be used if desired or any other suitable arrangement may obviously be employed. The controls and control mechanism for the operation of the vehicle are connected in the usual manner to be operated from the driver's cab 4 in the seated position of the operator.

The truck or bus may be provided with the usual front and rear bumpers 58, steps 60, lighting fixtures 62, and other usual accessories.

While the form of construction and arrangement as illustrated in Figures 1 to 6, above described, is the preferred form of the invention, it will be understood that other embodiments and various changes or modifications may be made in the use of the invention without departing from the spirit of the invention as above described. It will be understood for example that the front portion of the vehicle body and the front entrance door which have been illustrated and described as inclined may be made vertical and set back a sufficient distance so as not to interfere with lateral vision of the operator, or the front of the bus to the left of the cab, as seen from the front, might be set back slightly and the front portion and door might be laterally inclined (rearwardly) at an angle instead of being positioned at substantially right angles with the longitudinal axis of the bus or truck.

The invention as thus far described is more particularly adapted for the usual truck construction for the transportation of freight and the like. In applying the invention to a passenger bus for example, the body portion of the vehicle should obviously be provided with the usual windows 64 and the usual other accessories. In applying the invention to a passenger bus, it is preferable to employ a roll-up type of door 6' which may be operated pneumatically or in any other desired manner from the driver's cab 4'. It will be obvious that in applying the invention to a passenger bus, various advantages are obtained in the provision of the front door loading and unloading facilities, in that passengers may be loaded and unloaded from the curb 68, in the same manner that passengers are loaded and unloaded from a side door located in the front of the ordinary bus when it is pulled up to a curb at an angle, in the same manner as is illustrated in Fig. 7 of the drawings. It will be understood however that in the provision of a front entrance located slightly to the rear and to one side of the driver's cab, so that in the operation of the bus an unobstructed lateral view to the right may be had, there is an added advantage in that fares may be readily collected during the exit or entrance of the passengers from the cab window 20 and safety in driving is greatly enhanced by the unobstructed view to the right.

It will be understood that instead of the use of a roll-up form of door 6' in connection with a passenger bus as above described, the front opening may be provided with two hinged doors opening outwardly in the same manner as in the usual street car, each door being composed of two hinged sections so as to fold into closed position. It will be understood also that other modifications may be made without departing from the basic form of construction embodying the invention as above described.

It will be obvious that certain features of the invention may be applied with advantage to the form of truck as illustrated in Fig. 8 of the drawings for the transportation of fruit and vegetables or other produce. The body of the truck in this form of the invention is provided with stake sections which are held in place by the usual rings or sockets 69 attached to the floor section of the vehicle and into which the vertical stakes are passed. The driver's cab 4" is preferably in the same relative position as above described in connection with other forms. The stake sections may be considerably lower in height than that of the operator's cab. If desired, integral side sections 70 and 72 may be employed extending the full length to the rear of the vehicle body and a rear gate section 74 and a forward or front removable gate section 6" may be employed for loading the truck either from the rear or from the front as may be desired. In this form of the invention the stake sections may be low enough so as not to interfere with lateral vision of the driver to the right of the vehicle so that the front gate or door 6" may be positioned vertically and without being offset to the rear. It will be understood that this form of produce truck utilizes a considerable proportion of available space for the produce which in the ordinary form of produce truck of large size not only goes to waste but interferes seriously with lateral vision to the right in the operation of the vehicle.

It will be understood that although the invention has been described and illustrated mainly in connection with motor vehicles, certain features of the invention may be applied to electric cars or locomotives or other vehicles where the driver or operator is stationed at the front of the vehicle by which passengers or freight are to be transported. It will be obvious however that in the use of a front loading door as above described in connection with a vehicle running on tracks, the front loading and unloading feature does not have all of the advantages as when applied to a bus or truck, as it will be apparent that such a vehicle on tracks can not be moved in positions as desired to assist in providing the position for optimum loading conditions.

It will be understood that various changes or modifications may be made in the invention as above described without departing from the spirit or scope of the invention as defined in the claims.

Having thus described the invention, what is claimed as new is:

1. A power-operated vehicle comprising a closed vehicle body portion having enclosing sides, front and rear end-face portions and connecting roof portion, a front door in said front end-face portion opening into said body portion of the vehicle to permit front-end loading and unloading of the vehicle, said front door being disposed laterally in said front end-face portion, and an enclosed operator's cab integral with said body portion positioned at the front end portion of the vehicle, said cab being disposed laterally of said door and extending sufficiently in advance thereof to permit unobstructed lateral vision from the cab in the closed position of the door.

2. A power-operated vehicle comprising a closed vehicle body portion having enclosing sides, front and rear end-face portions, and connecting roof portion, a front door in said front end-face portion opening into the interior of the body portion to permit front-end loading and unloading of the vehicle, said front door being disposed mainly at one side of said front end-face portion, a closed operator's cab disposed mainly at the other side of said front end-face portion, the exterior portion of said cab merging with and forming part of said front end-face portion, the forward portion of the cab extending sufficiently in advance of said door to permit unobstructed lateral vision from the cab in the closed position of the door and a partition separating the interior portion of the cab from the interior of the said vehicle body portion.

3. A power-operated vehicle comprising a closed vehicle body portion having enclosing sides, front and rear end-face portions and integrally connected roof portion, said front end-face portion being sloped upwardly toward the rear of the vehicle at one side of the said front end-face portion, a front door in the said sloped portion opening into the interior of the said vehicle body portion to permit front-end loading and unloading of the vehicle, a closed operator's cab disposed at the other side of the said front end-face portion, the exterior portion of the cab merging with the said sloped portion, the adjacent roof portion and the adjacent side portion of the vehicle, front and lateral windows in the said cab, the forward portion of the cab with the lateral window adjacent the said door extending sufficiently in advance of the closed position of the door to permit unobstructed lateral vision from the said adjacent lateral window and a partition for separating the interior portion of the cab from the interior of the said vehicle body portion.

4. A power-operated vehicle comprising a closed vehicle body portion having enclosing sides, front and rear end-face portions and an integrally connected roof portion, one side portion of said front end-face portion being sloped upwardly toward the rear of the vehicle, a front door in said sloped side portion opening into the interior of the said vehicle body portion to permit front end loading and unloading of the vehicle, a closed operator's cab disposed at the other side portion of said front end-face portion, the exterior portion of the cab merging with said sloped side portion, the adjacent roof portion and adjacent side portion of the vehicle, the said adjacent roof portion being uniformly curved upwardly above said sloped side portion and said other side portion to provide space for a sleeping compartment immediately above and behind said sloped side portion and said cab so as to be accessible from said cab, a partition under said adjacent roof portion to serve as a floor section for said sleeping compartment, and an opening in said partition accessible from said cab to permit passage into said compartment from said cab, said cab being disposed so as to extend forwardly in advance of the said sloped side portion to permit unobstructed lateral vision from the cab in the closed position of the said door.

5. A power-operated vehicle comprising a closed vehicle body portion having enclosing sides, front and rear end-face portions and an integrally connected roof portion, one side portion of said front end-face portion being sloped upwardly toward the rear of the vehicle throughout substantially one half of the said front end-face portion, a door in said sloped side portion opening into the interior of the vehicle body portion to permit front loading and unloading of the vehicle, a closed operator's cab disposed at the other side portion of the said front end-face portion, the exterior portion of the cab merging with said sloped side portion, the adjacent roof portion and adjacent side portion of the vehicle, the said adjacent roof portion transversely of the vehicle being uniformly curved upwardly above said sloped side portion and said other side portion to provide space for a sleeping compartment under said curved roof portion transversely of the vehicle, a partition under said adjacent roof portion extending horizontally and transversely of the vehicle and a vertical partition extending transversely of the vehicle to separate the sleeping compartment space from the main body portion of the vehicle, the forward portion of the cab extending sufficiently in advance of the said door to permit unobstructed lateral vision from the cab in the closed position of the door.

CEYLON P. STRONG.